United States Patent [19]

Zenner et al.

[11] 4,350,357
[45] Sep. 21, 1982

[54] SHIPPING AND DISPLAY CART

[75] Inventors: Dennis W. Zenner; Jesse F. Jenkins, both of San Antonio, Tex.

[73] Assignee: Stinson Manufacturing Company, San Antonio, Tex.

[21] Appl. No.: 208,879

[22] Filed: Nov. 21, 1980

[51] Int. Cl.³ .............................................. B62D 53/06
[52] U.S. Cl. .................................. 280/79.3; 220/333; 292/114; 292/120
[58] Field of Search ........................ 280/79.1 R, 79.3; 220/332, 333, 326, 315; 105/243, 377; 292/94, 114, 120

[56] References Cited

U.S. PATENT DOCUMENTS

| | | | |
|---|---|---|---|
| 1,829,788 | 11/1931 | Cummins | 292/114 |
| 2,702,142 | 2/1955 | Jones | 292/120 X |
| 2,865,529 | 12/1958 | Sprouse | 220/333 |
| 3,861,704 | 1/1975 | DeWitte | 280/79.3 |
| 3,953,044 | 4/1976 | Wilson | 280/79.3 X |
| 4,275,665 | 6/1981 | Silverman | 280/79.3 X |

FOREIGN PATENT DOCUMENTS 257140  2/1928  Italy .................................... 292/120

Primary Examiner—Joseph F. Peters, Jr.
Assistant Examiner—Michael Mar
Attorney, Agent, or Firm—Cox & Smith Incorporated

[57] ABSTRACT

An enclosed shopping and display cart having a self-storing closure member enclosing one open side thereof with the self-storing closure member including a plurality of rigid sections which may be folded upon each other on the top of the cart out of the way for display, unloading, and transporting of the cart.

1 Claim, 5 Drawing Figures

SHIPPING AND DISPLAY CART

BACKGROUND OF THE INVENTION

This invention relates generally to shipping and display carts and more particularly to a self-storing closure member on a cart to obtain goods on the cart.

The use of shipping and display carts is well known in the prior art. Such prior art carts generally include a wheeled platform having either three or two side walls mounted around the perimeter of the cart providing one or two open walls for placing or displacing articles upon the cart. Such carts may also include a top member connecting the side walls to provide rigidity thereto and also to support objects as desired.

It has been a practice in the past to provide a closure member for the open side wall portions of the cart which closure member may either be rigid folding doors pivotally mounted about vertical axis or a plurality of flexible chain members. Carts which have used the chain members have also included spring connectors so that the chain members are extensible to allow the chains to be latched at their lower ends and when objects on the cart stick out beyond the perimeter of the cart.

A problem which occurs with the above type of prior art closure members of the carts is that the closure members function properly during transport of the cart but cannot be conveniently stored during unloading and display. In the case of doors pivoted about vertical axis, such doors must be pivoted away from the open wall of the display cart and either latched to the side or allowed to swing freely. During movement of and unloading of the carts, the doors may get in the way and may not allow carts to be positioned against each other when the doors are latched around the sides. Accordingly, it is sometimes necessary to retain the doors in their open position so that they will be out of the way.

In the case of flexible chains, they are draped over the top for storing and may become tangled and hang downwardly and be unsitely. Since the cart may also be used as a display cart it is important that it be aestectically pleasing.

It is an object of the invention to overcome the problems of the prior art by providing a wheeled cart having a closure member which may be easily stored on top of the cart out of the way. The closure member does not interfere with the displaying of items in the cart and remains in position on top when carts are being unloaded and are transported after delivering items to a store. Other objects of the invention will become apparent from the following detailed description.

SUMMARY OF THE INVENTION

The invention relates to a wheeled shipping and display cart having one or more self-storing closure members which allow the cart to be used as a display cart without interference of the closure member and also provides for storage of the closure member during periods when it is not in use. The closure member includes a plurality of rigid sections hingedly connected to each other and connected to the closure for folding substantially flat upon each other and flat against the top of the enclosure out of way for unloading, display and transport of the cart.

BRIEF DESCRIPTION OF THE PREFERRED EMBODIMENT

Figure 1:
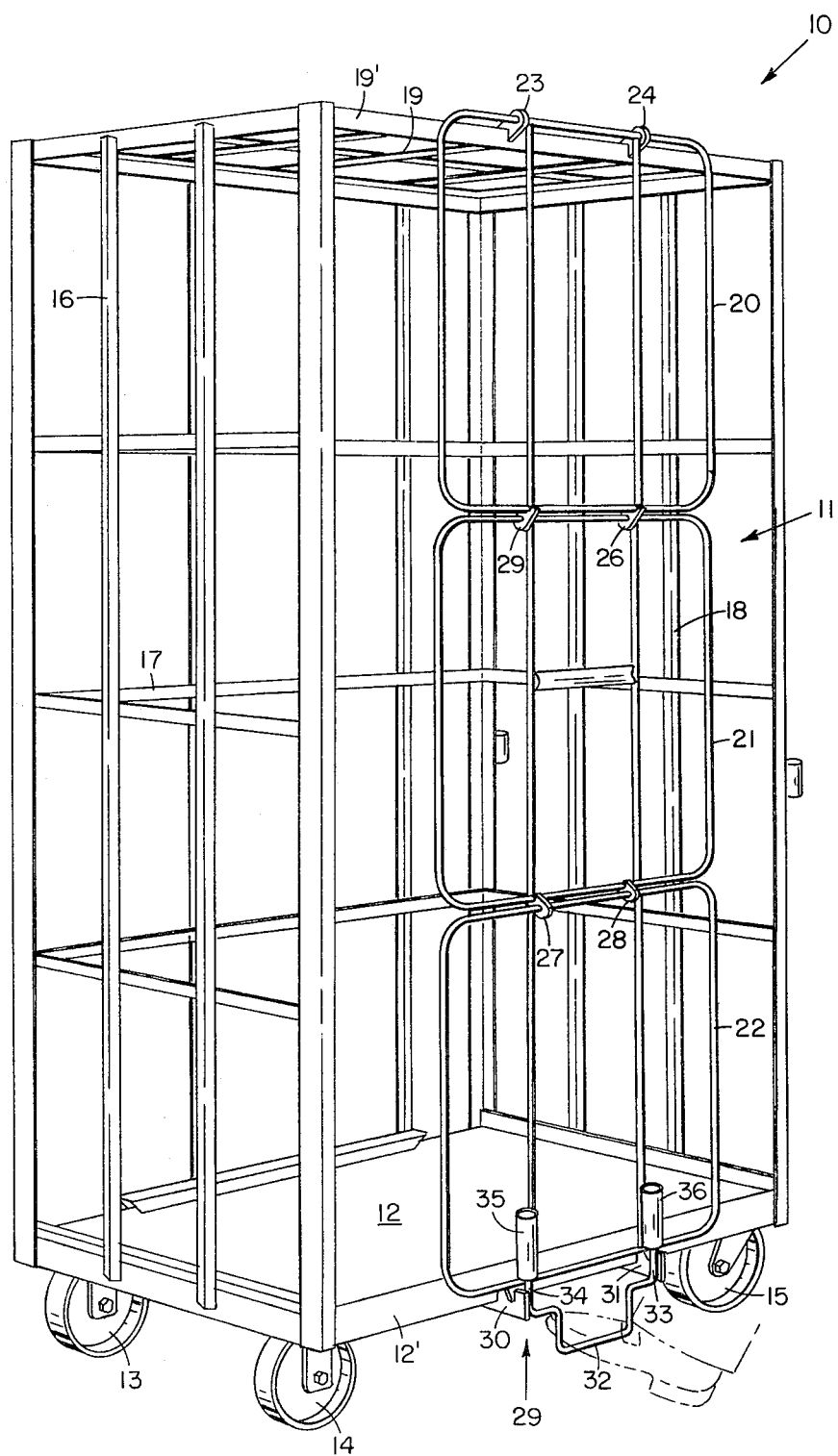
FIG. 1 is a side view showing a shipping and display cart with self-storing closure member in position.
Figure 2:
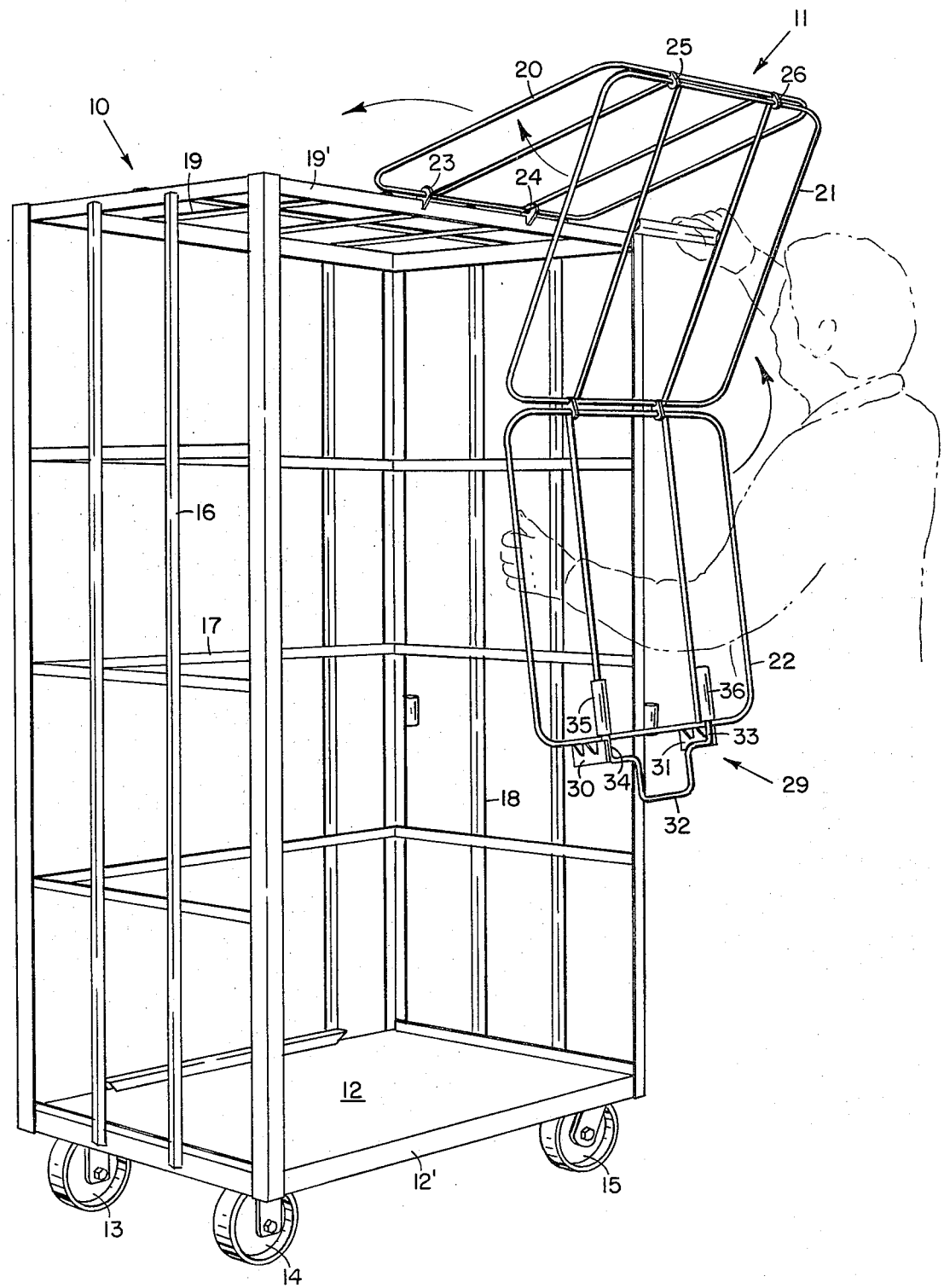
FIG. 2 is a shipping and display cart showing the folding of the closure member.

Referring to FIG. 1 of the drawing, there is shown a shipping and display cart 10 having a self-storing closure member 11. The shipping and display cart 10 is partially of conventional construction and includes a platform 12 supported on wheels 13, 14 and 15 and another wheel (not shown) at the other corner of the platform 12. The wheel 15 and the wheel which is not shown generally pivot about vertical axis for maneuvering the cart. Secured to the platform 12 is a first side wall 16, second side wall 17, and third side wall 18. A top wall 19 is connected to the first, second and third side walls. As will be apparent as shown in FIGS. 1 and 2, the walls are formed of a plurality of interconnected bars which will retain items on the platform 12 while allowing viewing of the same. The wall members are shown rigidly connected to each other although it is understood that they may be releaseably connected to each other for removal from the platform 12. It is understood that the walls could be formed of other suitable construction.

Although the cart 10 is shown having three side walls, it is understood that it could have two side walls leaving two openings opposite each other as desired.

Figure 3:
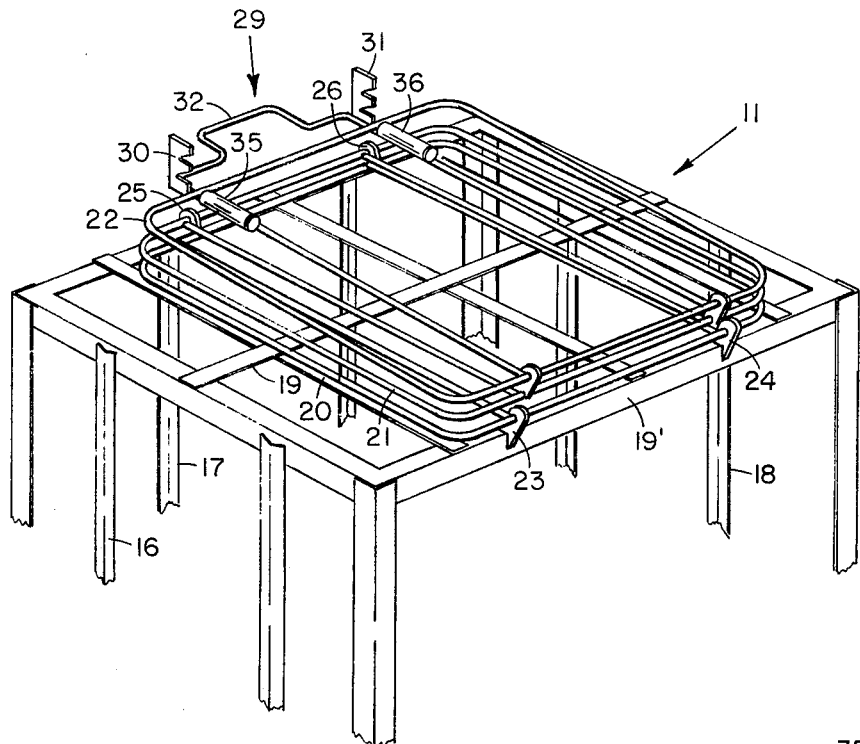
FIG. 3 shows the closure member folded in position on top of the shipping and display cart.

The self-storing closure member 11 includes a plurality of sections 20, 21 and 22. The rigid section 20 is hingedly mounted at its upper end by offset hinge members 23 and 24 which are rigidly connected to the bar 19' which forms a portion of the top wall 19. The hinge members 23 and 24 allow pivoting of the section 20 upwardly as shown in FIG. 2 to its folded position as shown in FIG. 3. The positioning of the hinge members 23 and 24 allow the section 20 to be folded substantially flat on the top wall 19 so that it will be out of the way. The section 21 is hingedly connected to the section 20 by hinge members 25 and 26. The hinge members 25 and 26 are likewise offset so that the section 21 may be pivoted upwardly as shown in FIG. 2 to a storage position as shown in FIG. 3 whereby the section 21 is substantially flat against the section 20. The section 22 is pivotally connected to the section 21 by hinge members 27 and 28. The hinge members 27 and 28 are offset so that the section 22 may be likewise folded upwardly as the section 21 as shown in FIG. 2 to a storage position as shown in FIG. 3. In this position the section 22 will be substantially flat on the sections 21 and 20.

Although the self-storing closure member 11 is shown as having three sections, 20, 21 and 22, it is apparent that it might comprise additional sections. Any additional sections would be interconnected as are the sections 20, 21 and 22 so they would all fold or stack substantially flat on each other on the top of the cart. As best shown in FIG. 3, the size of the sections 20, 21 and 22 is such that they are not bigger in size than the top wall 19 so that they do not extend past any of the side walls. The minimum number of sections is preferable with none of the sections being larger than the top wall. This prevents the sections from catching on any object as the cart is transported and when it bumps against any sidewall. Also, they do not extend outwardly from the cart where they might get in the way of anyone working around the cart.

The sections 20, 21 and 22 are preferably made of light-weight tubular metal so that they may be easily folded by an individual. Any suitable material or construction could be used which would provide rigid members which were hingedly connected to each other for folding flat against each other as shown in FIG. 3.

A suitable latching means 29 is provided at the lower end of section 22 for securing the self-storing closure member in position as shown in FIG. 1. The latching means 29 includes two serrated catches 30 and 31 for engaging the bar 12' on the platform. The notches in the catches 30 and 31 allow adjustment when objects extend slightly beyond the platform 12 in which are the outermost serration might engage the member 12'. When objects on the display cart do not extend beyond the platform 12, the inner most serration may be latched to the bar 12'. A foot engaging member 32 includes side portions 33 and 34 which are reciprocally mounted in spring retaining members 35 and 36. The spring retaining members 35 and 36 are rigidly secured to the section 22.

Figure 5:
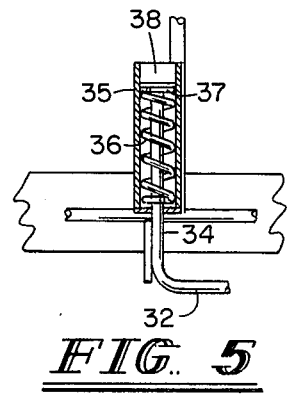
FIG. 5 is a crosssectional view showing the latching mechanism for the closure member.
Figure 4:
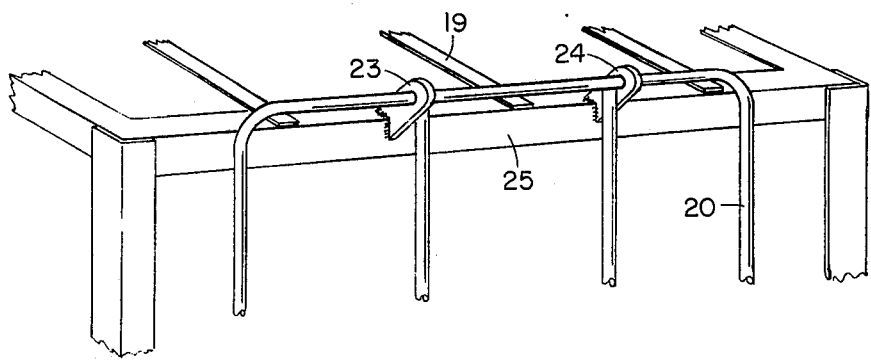
FIG. 4 is a partial view showing the upper hinge connection of the closure member.

As best shown in FIG. 5, the spring retaining member 35, which is identical to the spring retaining member 36, includes a spring 37 mounted therein which engages the spring retaining member 35 at the lower most end and a spring engaging stop member secured to the side portion 34 at its upper end. A top portion 39 engages the spring engaging stop member 38 to limit its upper movement.

When it is desired to unlatch the serrated catches 30 and 31 an operator merely places his foot on the foot engaging member 32 which causes the side portions 33 and 34 to move downwardly relative to the spring retaining members 35 and 36 against the bias of springs therein. This releases the serrated notches on the catches 30 and 31 from the member 12' so that the self-storing closure member 11 may be pivoted upwardly to its storage position as shown in FIG. 3. When it is desired to reposition the self-storing closure member 11 to its position as shown in FIG. 1 as shown in FIG. 3, the serrated catches 30 and 31 are moved downwardly by pressing against the member 32 so that the serrated notches may be engaged selectively with the bar 12'. Other suitable latching means may also be used.

Although the invention has been described in conjunction with the foregoing specific embodiment, many alternatives, variations and modifications will be apparent to those of ordinary skill in the art. Those alternatives, variations and modifications are intended to fall within the spirit and scope of the appended claims.

We claim:

1. An enclosed wheeled, shipping and display cart, comprising:

a wheeled cart having an enclosure for retaining articles being shipped thereon;

said enclosure having at least one side opening with a vertical closure member for selectively positioning in the opening to retain articles within the enclosure;

said vertical closure member including at least three rigid sections hingedly connected with each other and connected with the top of the enclosure for folding substantially flat upon each other and flat against the top of the enclosure out of the way for loading, displaying and transporting the cart;

said rigid sections being substantially equal in size and not greater in size than the top of the enclosure;

said rigid sections being connected by offset hinges so they can fold upon each other; and latch means for latching the gate member in place in the opening to retain articles in the enclosure, said latch means including a foot engaging member, spring means, spring retaining members for resiliently securing said foot engaging member to the lowermost end of said rigid sections, and horizontally disposed catches secured to said foot engaging member, each catch having at least two serrated notches for engaging the lower edge of said enclosure, wherein said latch means is extendably connected with the lowermost end of the rigid sections to allow the rigid sections to move outwardly from the enclosure to accomodate articles in the enclosure extending outwardly therefrom.

* * * * *